United States Patent
Segal

[19]

[11] Patent Number: 6,156,359
[45] Date of Patent: Dec. 5, 2000

[54] METHOD FOR FORMING A MOLDED CONFECTION

[75] Inventor: Eric Segal, Richmond Hill, Canada

[73] Assignee: All 4 Fun Consumers Products Inc., Richmond Hill, Canada

[21] Appl. No.: 09/090,089

[22] Filed: Jun. 3, 1998

Related U.S. Application Data

[60] Provisional application No. 60/049,820, Jun. 11, 1997.

[51] Int. Cl.[7] ............................. A23G 1/20; A23G 3/12
[52] U.S. Cl. ..................... 426/241; 426/421; 426/515; 426/231; 219/720; 264/402; 264/489; 264/490; 425/174.4; 425/256; 425/173; 116/216; 374/141; 374/162
[58] Field of Search ..................... 426/241, 243, 426/515, 421, 231; 249/108, 107, 110, 78, 168, 53 R; 425/174.4, 256, 170, 169, 173, DIG. 803; 264/489, 490, 402; 99/342; 116/216; 374/150, 151, 141, 149, 162, 161; 219/720

[56] References Cited

U.S. PATENT DOCUMENTS

| | | | |
|---|---|---|---|
| 211,859 | 2/1879 | Manley | 426/515 |
| 315,192 | 4/1885 | Walton | 249/108 |
| 761,727 | 6/1904 | Tiffany | 249/108 |
| 904,273 | 11/1908 | Mundt | 249/108 |
| 1,926,362 | 9/1933 | Berger | 249/108 |
| 1,931,769 | 10/1933 | Newton | 249/108 |
| 2,003,612 | 6/1935 | Schnaier | 249/110 |
| 2,074,500 | 3/1937 | York | 426/515 |
| 2,166,568 | 7/1939 | Kuhcke | 426/421 |
| 2,212,764 | 8/1940 | York | 426/515 |
| 2,285,149 | 6/1942 | D'Arcey | 426/515 |
| 2,843,493 | 7/1958 | Sharples | 426/515 |
| 3,022,554 | 2/1962 | Burke | 249/168 |
| 3,233,292 | 2/1966 | Kramer et al. | 249/78 |
| 3,255,498 | 6/1966 | Levthy et al. | 249/108 |
| 3,662,693 | 5/1972 | Dana | 264/299 |
| 3,907,245 | 9/1975 | Linder | 249/168 |
| 3,989,220 | 11/1976 | Greenberg | 249/105 |
| 4,042,204 | 8/1977 | Loebs et al. | 249/108 |
| 4,156,365 | 5/1979 | Heinmets et al. | |
| 4,746,523 | 5/1988 | Binley | 426/249 |
| 4,786,773 | 11/1988 | Keefer | 426/88 |
| 4,878,588 | 11/1989 | Ephraim | |
| 4,885,108 | 12/1989 | Richter | 264/489 |
| 4,905,957 | 3/1990 | Stockwell et al. | 249/108 |
| 4,919,983 | 4/1990 | Fremin | |
| 4,933,525 | 6/1990 | Phillips | 426/88 |

(List continued on next page.)

FOREIGN PATENT DOCUMENTS

| | | | |
|---|---|---|---|
| 2426249 | 5/1978 | France | 426/88 |
| 58-220715 | 12/1983 | Japan | 264/489 |
| 63-301750 | 12/1988 | Japan | 426/241 |
| 2141909 | 1/1985 | United Kingdom | 264/489 |

OTHER PUBLICATIONS

Fresno Bee, Wed. Dec. 12, 1990, Section: Food, p.:E11 (Dialog Abstract).
Record (Northern N.J.) Sat. Oct. 10, 1992, Section : Lifestyle, p.:C02 (Dialog Abstract).
HFD Aug. 13, 1990, p. 59 (Dialog Abstract).
HFD Aug. 27, 1990 p. 64 (Dialog Abstract).
Product Alert Jan. 23, 1995 (Dialog Abstract).
Product Alert Aug. 12, 1996 (Dialog Abstract).
Specialty Food Merchandising 31(1) p. 34 (Dialog Abstract) Jul. 1986.

*Primary Examiner*—Steven Weinstein
*Attorney, Agent, or Firm*—Paul S. Sharpe; Marks & Clerk

[57] ABSTRACT

A microwaveable confection mold for use in a conventional microwave oven. The mold permits solid confection capable of melting when exposed to microwave energy to be introduced into the mold. The mold comprises a clear microwave transparent plastic material to facilitate observation of the confection melting process with subsequent settling in the mold sections. A pigment in the mold changes the colour to indicate to the user when the liquified confection has hardened and the mold cooled.

4 Claims, 3 Drawing Sheets

U.S. PATENT DOCUMENTS

| | | | |
|---|---|---|---|
| 5,151,279 | 9/1992 | Kimura | 425/180 |
| 5,180,598 | 1/1993 | Jozefowicz | 426/88 |
| 5,346,656 | 9/1994 | Shafir | 264/489 |
| 5,464,968 | 11/1995 | Germain et al. | 426/88 |
| 5,582,856 | 12/1996 | White et al. | 426/249 |
| 5,678,925 | 10/1997 | Germaise et al. | |
| 5,720,555 | 2/1998 | Elele. | |
| 5,738,895 | 4/1998 | Fuchs | 426/515 |
| 5,786,578 | 7/1998 | Christy et al. | |
| 5,788,369 | 8/1998 | Tseng. | |
| 5,860,540 | 1/1999 | Bock. | |
| 5,997,964 | 12/1999 | Klima. | |

METHOD FOR FORMING A MOLDED CONFECTION

This application claims the benefit of U.S. provision application Ser. No. 60/049,820 filed Jun. 11, 1997.

FIELD OF THE INVENTION

The present invention relates to a microwaveable confection mold and more particularly, the invention relates to a reusable microwaveable mold suitable for molding lollipops or other confection products.

BACKGROUND OF THE INVENTION

Mold products are well known in the art and have been employed for molding food and confection products into a variety of shapes. Typical of the prior art arrangements is set forth in U.S. Pat. No. 4,746,523 issued to Binley, May 24, 1988. In this reference an ice cream product mold is disclosed. The mold involves the use of a plunger and syringe to charge a mold with an ice cream product. The arrangement, although useful, involves several steps and would present some difficulty for use by a child.

U.S. Pat. No. 3,662,693, issued to Dana, May 16, 1972, discloses a plastic 20 mold for molding candy. The reference teaches an improved mold which is not as susceptible to heat damage when hot material is poured into the mold.

White et al., in U.S. Pat. No. 5,582,856, issued Dec. 10, 1996, provides a mold for a frozen confection. The mold permits a plurality of flavors to be incorporated into the same product.

A mold of the shaker type is taught in U.S. Pat. No. 3,989,220, and issued Nov. 2, 1976, to Greenberg. The arrangement provides a molding compound for mixing and pouring into a mold. The mixture simply hardens and a character is removed.

The existing molds in the art do not provide the possibility of using a conventional microwave oven to form lollipops and other confectionary products which also permits a user to view the formation process and have visual identification when the process is complete. It would be desirable to have a mold with these features; the present invention provides such features as well as a host of others.

SUMMARY OF THE INVENTION

One object of the present invention is to provide an improvement in confection molds and a method of using such molds.

A further object of one embodiment of the present invention is to provide a microwaveable confection mold for molding a confection, comprising:

a mold having at least two sections configured for releasable sealing engagement, the sections comprising a material at least partially transparent to microwaves, each section of the mold having a mold cavity; and storage means in at least one of the sections for storing a charge of solid confection capable of changing to a fluid state upon exposure to microwave energy for settling in each cavity, the storage means arranged to dispense liquified confection into the sections.

Another object of one embodiment of the present invention is to provide a microwaveable confection mold for molding a confection, comprising:

a mold having at least two sections configured for releasable sealing engagement, the sections comprising a material at least partially transparent to microwaves, each section of the mold having a mold cavity;

storage means in at least one of the sections for storing a charge of solid confection capable of changing to a fluid state upon exposure to microwave energy for settling in each cavity, the storage means arranged to dispense liquified confection into each section of the sections; and pigment in the material, the pigment for changing the colour of the material when the temperature of the mold has cooled subsequent to microwave exposure.

A still further object of one embodiment of the present invention is to provide a method of forming a confection, comprising the steps of:

providing a mold having at least two sections, each section having a mold cavity, the mold comprising a material at least partially transparent to microwaves;

filling at least one of the sections with a solid confection;

exposing the mold to microwave energy to liquify the confection; and cooling the mold to form a solid molded confection.

The present invention provides a microwaveable transparent mold for making lollipops and other confections. Advantageously, the mold is visually transparent enabling the user to see the formation of the confection. As an optional feature, a pigment may be impregnated in the plastic to indicate when the mold is sufficiently cool for removal from the microwave oven and also corresponds to the completion of the hardening process of the liquified confection material. This feature is beneficial since it avoids the possibility of the user becoming burned or the mold being opened by the user prior to the completion of the hardening process. In the instance where pigment is not included, the mold may be simply left to cool for a sufficient length of time. Where pigment is employed, the same comprise a reversible colour pigment such as that manufactured by Matsui Chemical Co. Ltd. of Japan. This pigment includes both thermochromic and photochromic compounds.

The choice of plastic materials for the composition of the mold may vary from any of those suitable for use in foodstuff preparation and which also provide the feature of microwave transparency.

The mold sections may take any shape or form examples of which include polygonal, circular, animal or people shapes or indicia, letters, numbers, combinations of the foregoing, etc.

As a further advantage, unused portions of a molded confection may be stored in the mold or the unused portion simply reheated in the storage container for reuse in the fabrication of another lollipop, etc.

In other variations, the mold may avoid the use of a stick to fabricate candies. It is further contemplated that the mold sections may include channels arranged in a predetermined pattern to result in the formation of a multiple coloured/multiple flavored confection product.

Having thus described the invention, reference will now be made to the accompanying drawings illustrating preferred embodiments.

BRIEF DESCRIPTION OF THE DRAWINGS

Similar numerals used in the text denote similar elements

DETAILED DESCRIPTION OF THE PREFERRED EMBODIMENTS

Figure 1:
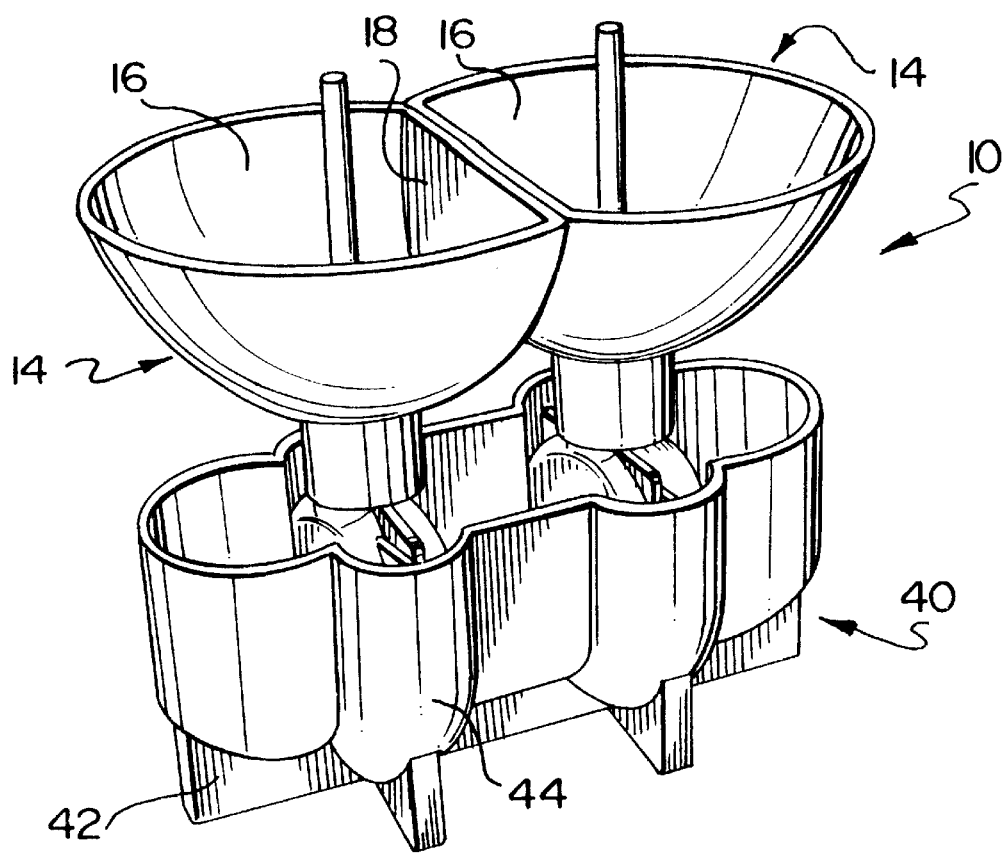
FIG. 1 is a perspective view of one embodiment of the present invention.
Figure 3:
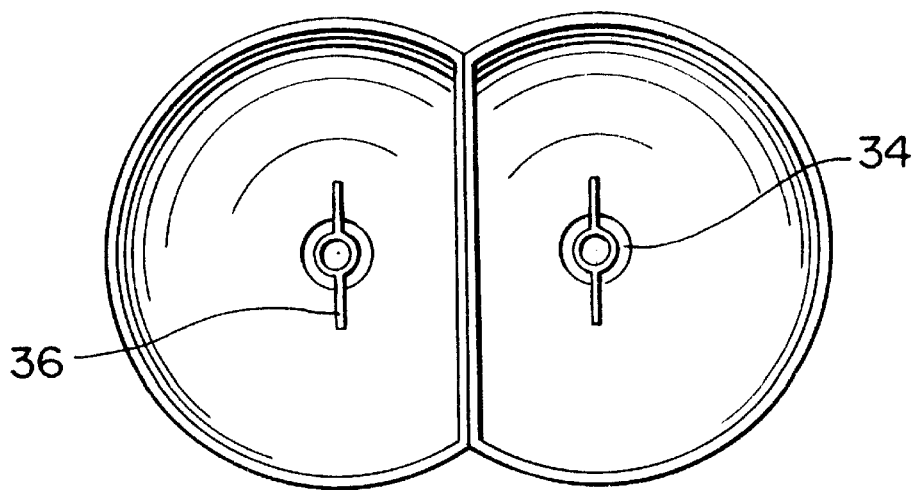
FIG. 3 is a top view of FIG. 1.

Referring now to the drawings, the mold, generally denoted by numeral 10, includes a pair of lollipop units 14, each of which provides a storage container 16 for storing solid confection material, the latter not being shown. The containers 16 function to store solid confection and to funnel liquified confection into the mold sections discussed hereinafter. In the example, two containers 16 are shown serially arranged. Each has a flat side 18 configured for facing relation, the sides 18 serving to impart a degree of stability to the entire mold 10 and prevent spillage of the contents.

With respect to the material of which the mold may be made, suitable microwave transparent materials include polyethylene, polystyrene, polypropylene, polysulphin, PTFE and polycarbonate. Any safe microwave transparent plastic material may be used which is FDA approved.

Figure 2:
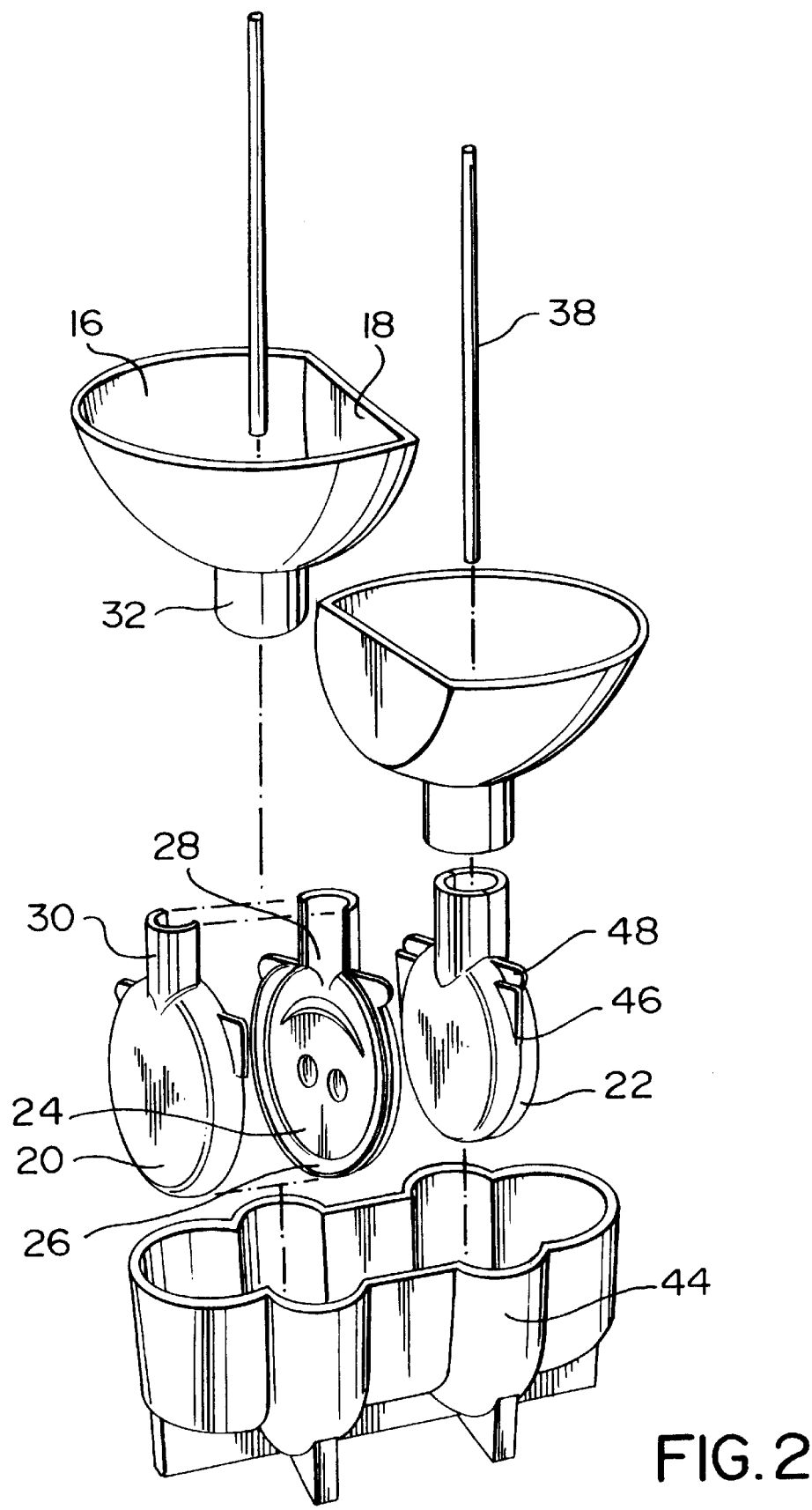
FIG. 2 is an exploded view of FIG. 1.

The mold sections 20 and 22, shown more clearly in FIG. 2, comprise, as an example, circular members each having an interior 24 recessed from a top edge 26 to generally provide a concave section. Each or both sections may include indicia 28, shown in the example as facial features. The indicia 28 may be relieved or recessed from the surface of the interior. In order to provide fluid communication between the mold sections 20,22 and containers 16, the former each include elongate generally semicircular members 30 forming a cylindrical tube when the sections 20,22 are brought into contact as illustrated. This arrangement is received for frictional releasable engagement with a cylindrical tube 32 extending from each container 16. Tube 32 has a greater diameter than the tube formed by extensions 30 and thus the tubes are frictionally retained when in contact.

Each container 16 includes an aperture 34 for passage of liquified confection (not shown) through to the mold sections 20,22. Additionally, a stick locating member 36 is included for positioning a stick 38 centrally between the mold sections 20,22.

In order to assist in positioning and retaining the mold sections 20,22 together, a holder 40 is provided. The holder 40 has a base 42 and clamping pockets 44 molded into the holder 40. The pockets 44 frictionally retain the assembled mold sections 20,22 in an upright attitude and sufficiently snugly to prevent any leakage of liquified confection (not shown). The holder 40 permits the arrangement to cool subsequent to microwave exposure.

In operation, the containers 16 are connected to assembled mold sections 20,22 positioned within pockets 44 of holder 40. Stick 38, typically rolled paper, is optionally inserted through container 16 and locator 36. Containers 16 are charged with solid confection (not shown) which is generally granular in form. The arrangement is then exposed to microwaves in a typical microwave oven (not shown). Once the confection has melted, the liquid flows into the mold sections 20,22. When the confection has cooled into a solid within the sections 20,22 and the mold has changed colour indicating that the same is sufficiently cool to touch, the mold may be removed. Some of the confection may enter into the mold sections prior to melting without any effect on the fabrication of the final product. To remove the lollipop (not shown), the containers and the mold sections are removed. The mold sections each include nonregistering tabs 46 and 48,which allow a user to gently pry the sections apart to provide access to the completed lollipop.

Figure 4:
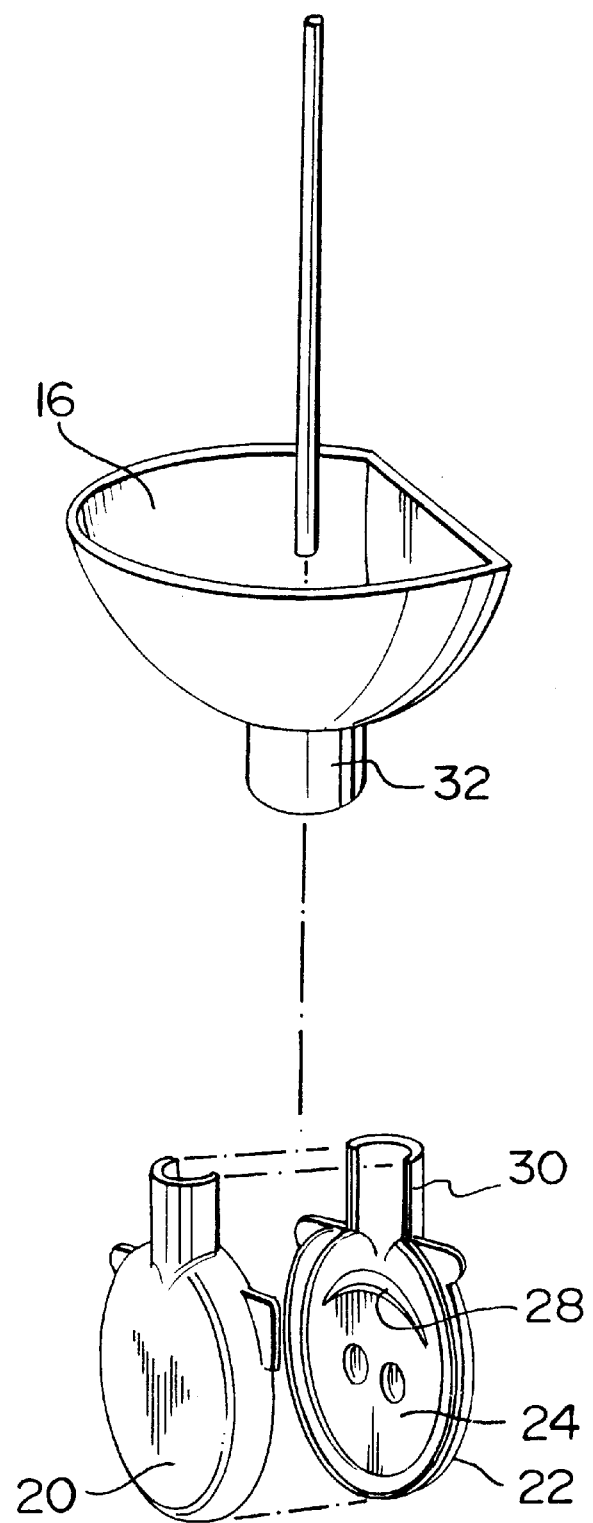
FIG. 4 is an exploded view of an alternate embodiment of the present invention.

FIG. 4 illustrates an exploded view of an alternate embodiment of the invention where a single mold unit is shown. It will be apparent that any number of units may be provided in serial, parallel or other arrays.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method of forming a molded confection, comprising the steps of:

providing a mold having at least two sections, each section having a mold cavity, the mold comprising a material at least partially transparent to microwaves;

providing a heat sensitive reversible color pigment in said mold, which pigment changes color and imparts the color change to the mold; said pigment and thus said mold being selected to change color to indicate when said mold is cool to the touch;

filling at least one of said sections with a solid confection;

placing said mold containing said solid confection into a microwave oven;

exposing said mold and said solid confection to microwave energy while in said oven to liquify said confection;

cooling said mold and said liquified confection to resolidify said liquified confection to form a solid molded confection; and removing said mold and confection from said oven when the mold changes color to signify sufficient cooling of said mold so that it is cool to the touch and the confection has resolidified to form said molded confection.

2. The method as set forth in claim 1, further including the step of inserting a stick between said sections.

3. The method as set forth in claim 1, including the step of filling a storage means connected to said mold with said confection for melting when exposed to said microwave energy, whereby liquified confection flows by gravity to said mold sections.

4. The method as set forth in claim 3, including the step of separating said sections to remove a cooled solid confection.

* * * * *